(12) United States Patent
Kodama et al.

(10) Patent No.: US 9,406,323 B2
(45) Date of Patent: Aug. 2, 2016

(54) SLIDER WITH ALUMINUM COMPOUND FILL

(71) Applicant: HGST Netherlands B.V., Amsterdam (NL)

(72) Inventors: Mineaki Kodama, Makati (PH); Reimar Azupardo, Legazpi (PH); Hannah Rillera, Santa Rosa (PH)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/562,268

(22) Filed: Dec. 5, 2014

(65) Prior Publication Data
US 2016/0163339 A1 Jun. 9, 2016

(51) Int. Cl.
G11B 5/187 (2006.01)
G11B 5/40 (2006.01)
G11B 5/255 (2006.01)
G11B 5/31 (2006.01)

(52) U.S. Cl.
CPC .... *G11B 5/40* (2013.01); *G11B 5/255* (2013.01); *G11B 5/3106* (2013.01); *G11B 5/187* (2013.01)

(58) Field of Classification Search
USPC ........................................................ 360/235.2
See application file for complete search history.

(56) References Cited

U.S. PATENT DOCUMENTS

| 5,159,508 | A | * | 10/1992 | Grill et al. ................. 360/235.2 |
| 5,805,380 | A | | 9/1998 | Ishihara et al. |
| 5,943,187 | A | * | 8/1999 | Chen et al. ................. 360/235.2 |
| 5,986,851 | A | | 11/1999 | Angelo et al. |
| 6,117,283 | A | | 9/2000 | Chen et al. |
| 6,249,403 | B1 | | 6/2001 | Tokisue et al. |
| 6,416,935 | B1 | | 7/2002 | Hsiao et al. |
| 6,433,965 | B1 | * | 8/2002 | Gopinathan et al. ....... 360/235.4 |
| 6,477,011 | B1 | | 11/2002 | Hsiao et al. |
| 6,842,308 | B1 | * | 1/2005 | Pust et al. .................. 360/234.7 |
| 7,782,569 | B2 | * | 8/2010 | Cheng et al. ............... 360/235.1 |
| 8,472,134 | B2 | * | 6/2013 | Kodama et al. ............... 360/110 |
| 2002/0027744 | A1 | * | 3/2002 | Sato ....................... G11B 5/255 360/122 |
| 2003/0231435 | A1 | * | 12/2003 | Kong et al. .................... 360/317 |
| 2005/0068691 | A1 | * | 3/2005 | Kagami et al. ............. 360/324.2 |
| 2006/0077593 | A1 | * | 4/2006 | Ueda ........................... 360/235.1 |
| 2008/0187781 | A1 | * | 8/2008 | Cheng et al. ................... 428/812 |
| 2008/0266715 | A1 | * | 10/2008 | Bhatia et al. ............... 360/235.4 |
| 2010/0073815 | A1 | * | 3/2010 | Aoki et al. .................... 360/110 |
| 2010/0302685 | A1 | * | 12/2010 | Yamada ................ G11B 5/102 360/245.3 |

OTHER PUBLICATIONS

Advanced Stiction-Free Slider and DLC Overcoat http://www.fujitsu.com/downloads/MAG/vol37-2/paper11.pdf.
K)Transfer of an Evolving Technology https://dspace.mit.edu/bitstream/handle/1721.1/34715/47006063.pdf?sequence=1.

* cited by examiner

*Primary Examiner* — Carlos E Garcia
(74) *Attorney, Agent, or Firm* — Patterson & Sheridan, LLP

(57) ABSTRACT

Embodiments disclosed herein generally relate to a magnetic device. The magnetic head of the magnetic device includes structure for protecting the media facing surface (MFS). The protective structure, which may be referred to as an air bearing surface overcoat (ABSOC) structure, includes an aluminum containing compound that is disposed on the slider and head. The ABSOC also includes a silicon containing compound and a carbon layer disposed thereover.

8 Claims, 7 Drawing Sheets

SLIDER WITH ALUMINUM COMPOUND FILL

BACKGROUND

1. Field

Embodiments disclosed herein generally relate to a magnetic head for use in a magnetic recording device.

2. Description of the Related Art

In magnetic recording, oftentimes a magnetic recording/reading head is disposed in a device, such as a hard disk drive (HDD) opposite a disk, which may be rotating. The disk typically rotates about an axis while the head is positioned over the disk. The head is movable from the inner diameter of the rotating disk to the outer diameter of the rotating disk. By rotating the disk, and moving the head, each data location of the disk may be read/written by the head.

An air gap is present between the head and the disk. During operations, the disk rotates and the head is biased towards the disk, yet the head still does not touch the disk during operations. Unfortunately, the head does, sometimes, come into contact with the disk. When the head contacts the disk, the event is called a 'touchdown', and the data location on the disk typically is no longer usable.

The head includes a read portion having a sensor element for reading information from the disk and additionally includes a write portion for writing data to the data locations on the disk. The write portion and the read portion are sensitive to damage. If there is a touchdown, not only will the data locations of the disk be damaged, but the read portion and the write portion of the head may be damaged as well.

Therefore, there is a need in the art for an improved magnetic recording device where the head is better protected from damage that may occur during a touchdown event.

SUMMARY

Embodiments disclosed herein generally relate to a magnetic device. The magnetic head of the magnetic device includes structure for protecting the media facing surface (MFS). The protective structure, which may be referred to as an air bearing surface overcoat (ABSOC) structure, includes an aluminum containing compound that is disposed on the slider and head. The ABSOC also includes a silicon containing compound and a carbon layer disposed thereover.

In one embodiment, a magnetic head comprises a magnetic head having an air bearing surface for facing the magnetic disk; and an air bearing surface overcoat structure disposed on the air bearing surface, wherein the air bearing surface overcoat structure comprises an aluminum containing compound.

In another embodiment, a magnetic device comprises a slider having a surface for facing a magnetic disk; a magnetic head coupled to the slider, wherein the magnetic head has an air bearing surface for facing the magnetic disk; and an air bearing surface overcoat structure disposed on the air bearing surface, wherein the air bearing surface overcoat structure comprises an aluminum containing compound.

In another embodiment, a method of manufacturing a magnetic device comprises ion beam etching an air bearing surface of a slider and magnetic head; and depositing an air bearing surface overcoat structure over the air bearing surface, wherein the air bearing surface overcoat structure comprises an aluminum containing compound.

BRIEF DESCRIPTION OF THE DRAWINGS

So that the manner in which the above recited features can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s).

Embodiments disclosed herein generally relate to a magnetic device. The magnetic head of the magnetic device includes structure for protecting the MFS. The protective structure, which may be referred to as an ABSOC structure, includes an aluminum containing compound that is disposed on the slider and head. The ABSOC also includes a silicon containing compound and a carbon layer disposed thereover.

Figure 1:
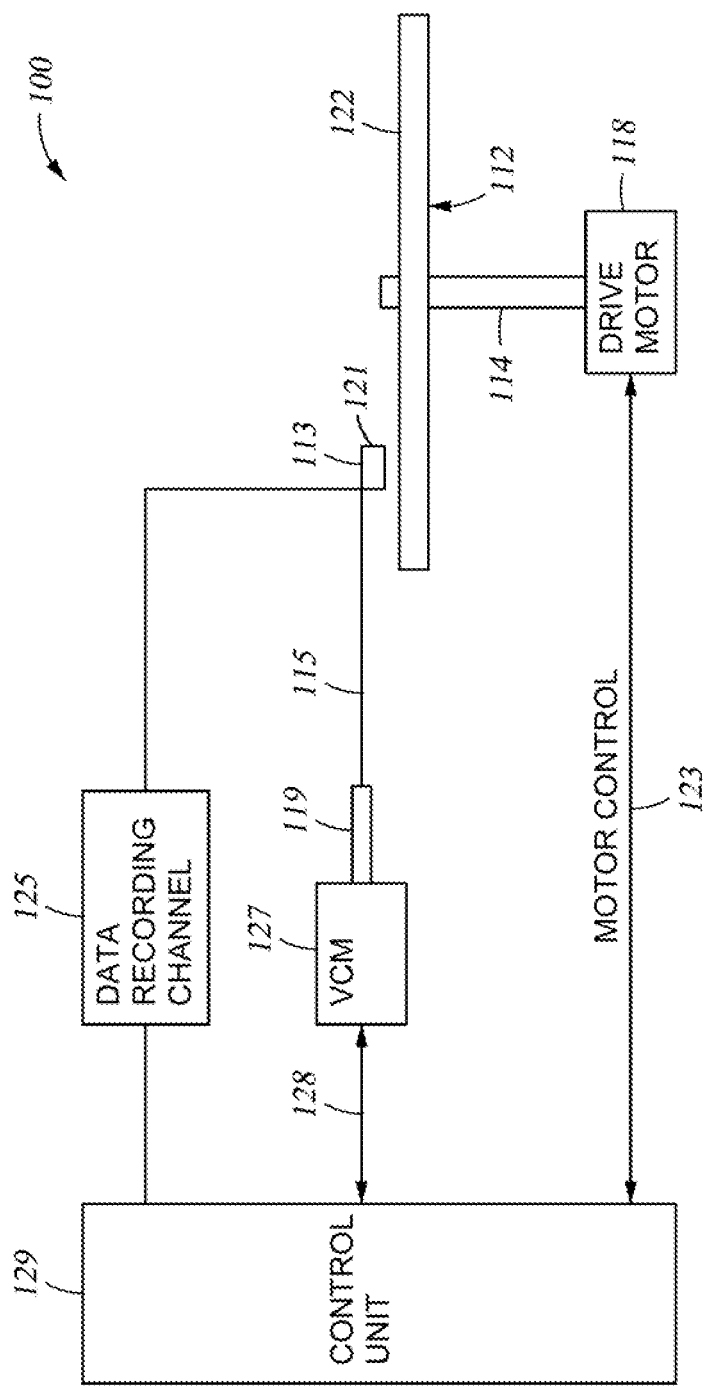
FIG. 1 illustrates a disk drive system, according to embodiments described herein.

FIG. 1 illustrates a disk drive 100 according to embodiments described herein. As shown, at least one rotatable magnetic media, such as a magnetic disk 112, is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a spin torque oscillator (STO) for applying an AC magnetic field to the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2A:
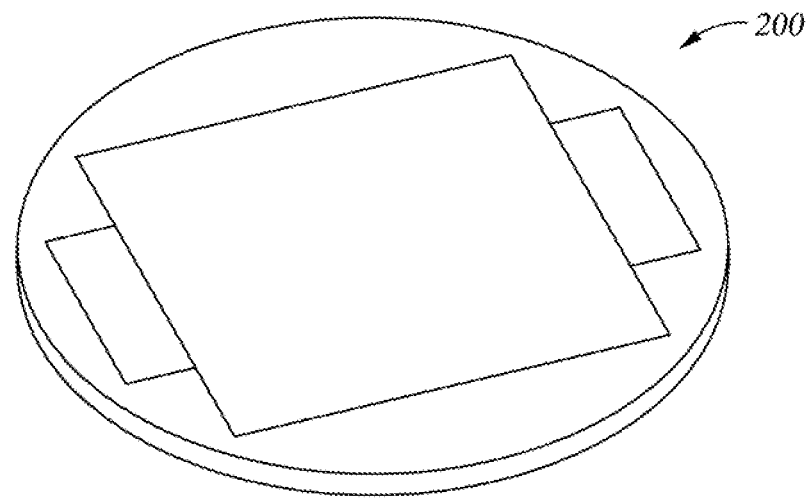
FIGS. 2A-2D are schematic isometric illustrations of sliders are various stages of manufacture.
Figure 2B:
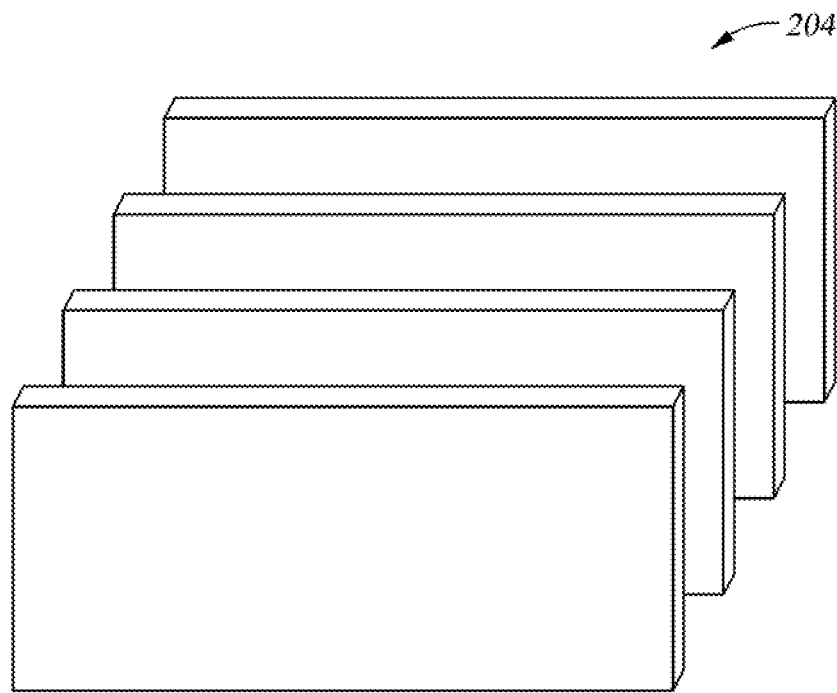
Figure 2C:
Figure 2D:
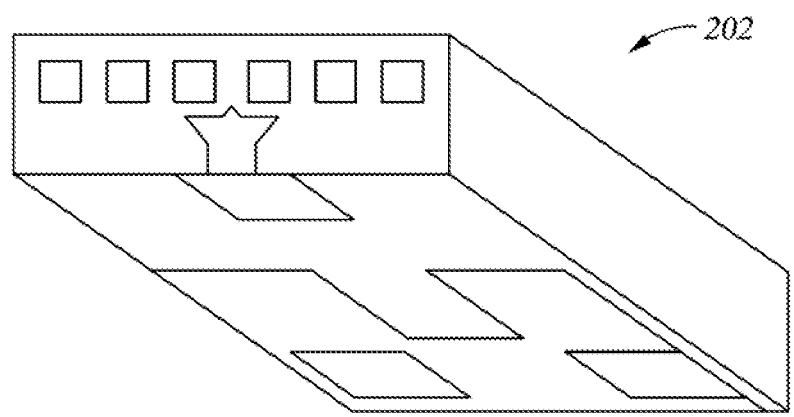

FIGS. 2A-2D are schematic isometric illustrations of sliders are various stages of manufacture. FIG. 2A shows a substrate 200 that has been processed to produce numerous sliders 202. During manufacturing, many hundreds of sliders 202 are fabricated on a substrate 200. The sliders 202 are initially formed on the substrate 200 as shown in FIG. 2A. The sliders 202 are then cut from the substrate 200. Initially, the sliders 202 are cut into groups of sliders 202 that are referred to as quads 204 as shown in FIG. 2B. The quads are cut from the substrate 200 as four pieces, however it is to be understood that more or less pieces may be cut from the substrate 200 so long as all of the sliders 202 are removed from the substrate 200. The quads 204 are then cut into rows 206 of sliders 202 as shown in FIG. 2C. While the sliders 202 are in the row bar, the ABSOC is deposited onto the sliders 202 and accompanying heads. Thereafter, the sliders 202 are individually cut from the rows 206 as shown in FIG. 2D.

As discussed above, while the sliders 202 are still in rows 206, the ABSOC is deposited on the sliders 202 and the accompanying heads that are attached to the corresponding sliders 202.

Figure 3:
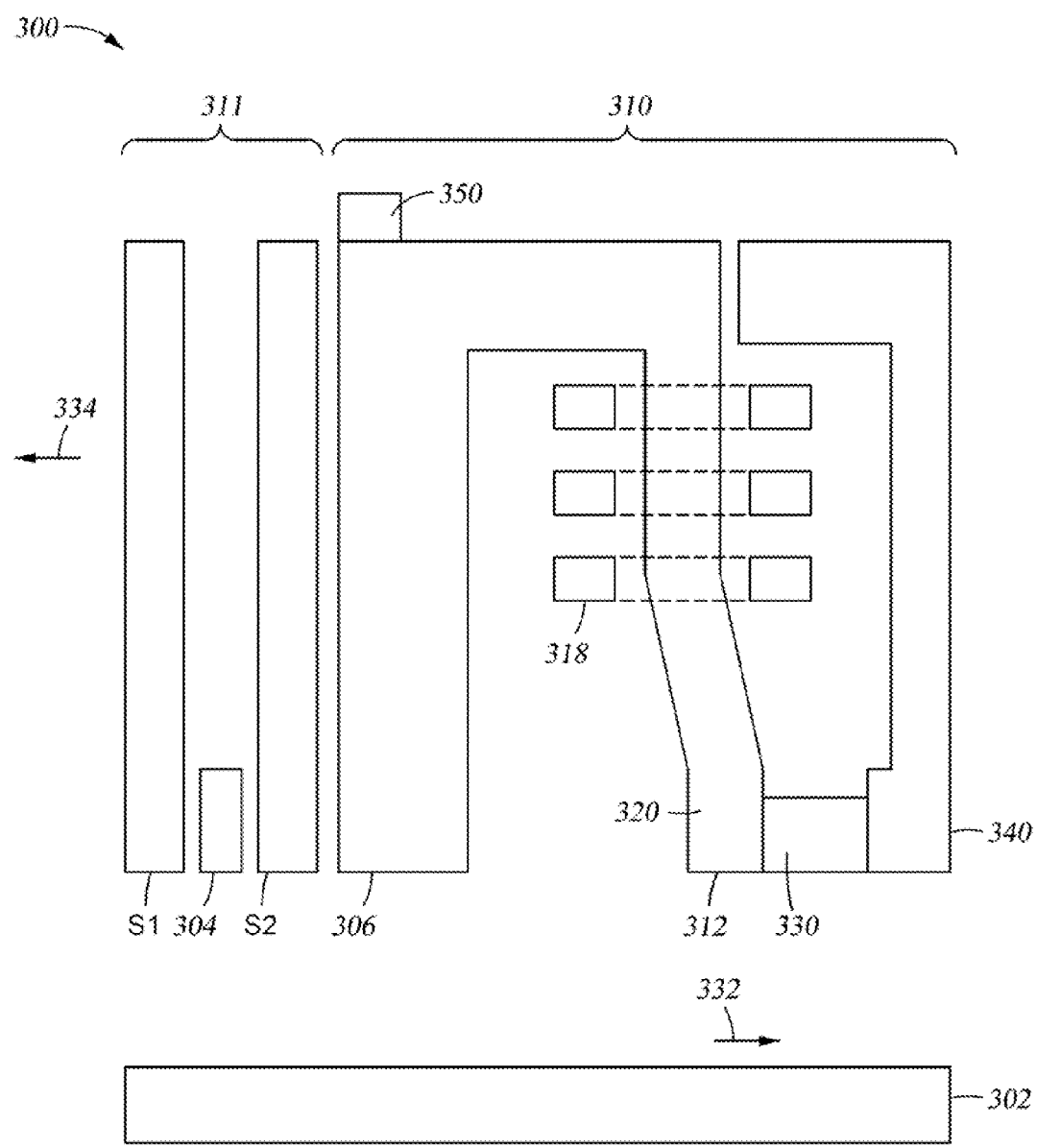
FIG. 3 is a schematic cross-sectional illustration of a magnetic device according to one embodiment.

FIG. 3 is a schematic cross-sectional illustration of a magnetic device according to one embodiment. The magnetic device includes a read/write head 300 facing a magnetic disk 302. The read/write head 300 and magnetic disk 302 may correspond to the magnetic head assembly 121 and magnetic disk 112, respectively in FIG. 1. The read/write head 300 includes a MFS 312, such as an air bearing surface (ABS), a magnetic write head 310 and a magnetic read head 311, and is mounted such that the MFS 312 is facing the magnetic disk 302. In FIG. 3, the disk 302 moves past the write head 310 in the direction indicated by the arrow 332 and the read/write head 300 moves in the direction indicated by the arrow 334.

In some embodiments, the magnetic read head 311 is a magnetoresistive (MR) read head that includes an MR sensing element 304 located between MR shields S1 and S2. In other embodiments, the magnetic read head 311 is a magnetic tunnel junction (MTJ) read head that includes a MTJ sensing device 304 located between MR shields S1 and S2. The magnetic fields of the adjacent magnetized regions in the magnetic disk 302 are detectable by the MR (or MTJ) sensing element 304 as the recorded bits.

The write head 310 includes a return pole 306, a main pole 320, a trailing shield 340, an STO 330 disposed between the main pole 320 and the trailing shield 340, and a coil 318 that excites the main pole 320. A recording magnetic field is generated from the main pole 320 and the trailing shield 340 helps making the magnetic field gradient of the main pole 320 steep. The main pole 320 may be a magnetic material such as a CoFe alloy. In one embodiment, the main pole 320 has a saturated magnetization (Ms) of 2.4 T and a thickness of about 300 nanometers (nm). The trailing shield 340 may be a magnetic material such as NiFe alloy. In one embodiment, the trailing shield 340 has an Ms of about 1.2 T.

The main pole 320, the trailing shield 340 and the STO 330 all extend to the MFS 312, and the STO 330 disposed between the main pole 320 and the trailing shield 340 is electrically coupled to the main pole 320 and the trailing shield 340. The STO 330 may be surrounded by an insulating material (not shown) in a cross-track direction (into and out of the paper). During operation, the STO 330 generates an AC magnetic field that travels to the magnetic disk 302 to lower the coercivity of the region of the magnetic disk 302 adjacent to the STO 330. The write head 310 further includes a heater 350 for adjusting the distance between the read/write head 300 and the magnetic disk 302. The location of the heater 350 is not limited to above the return pole 306, as shown in FIG. 3. The heater 350 may be disposed at any suitable location.

Figure 4A:
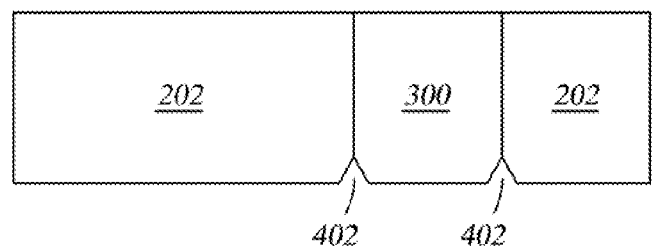
FIGS. 4A-4E are schematic illustrations of a magnetic device at various stages of fabrication according to one embodiment of the disclosure.
Figure 4B:
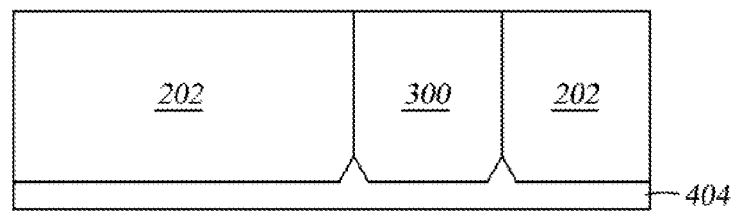
Figure 4C:
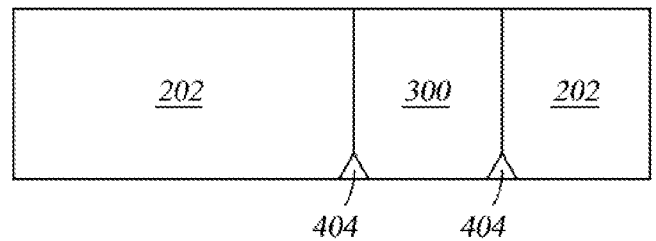
Figure 4D:
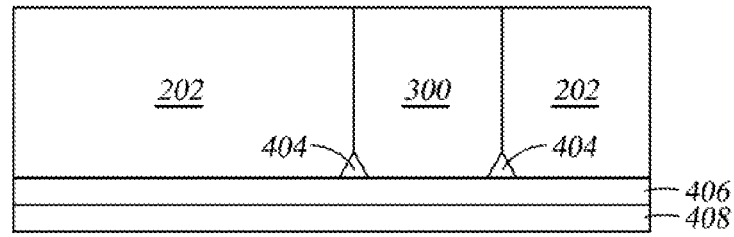
Figure 4E:
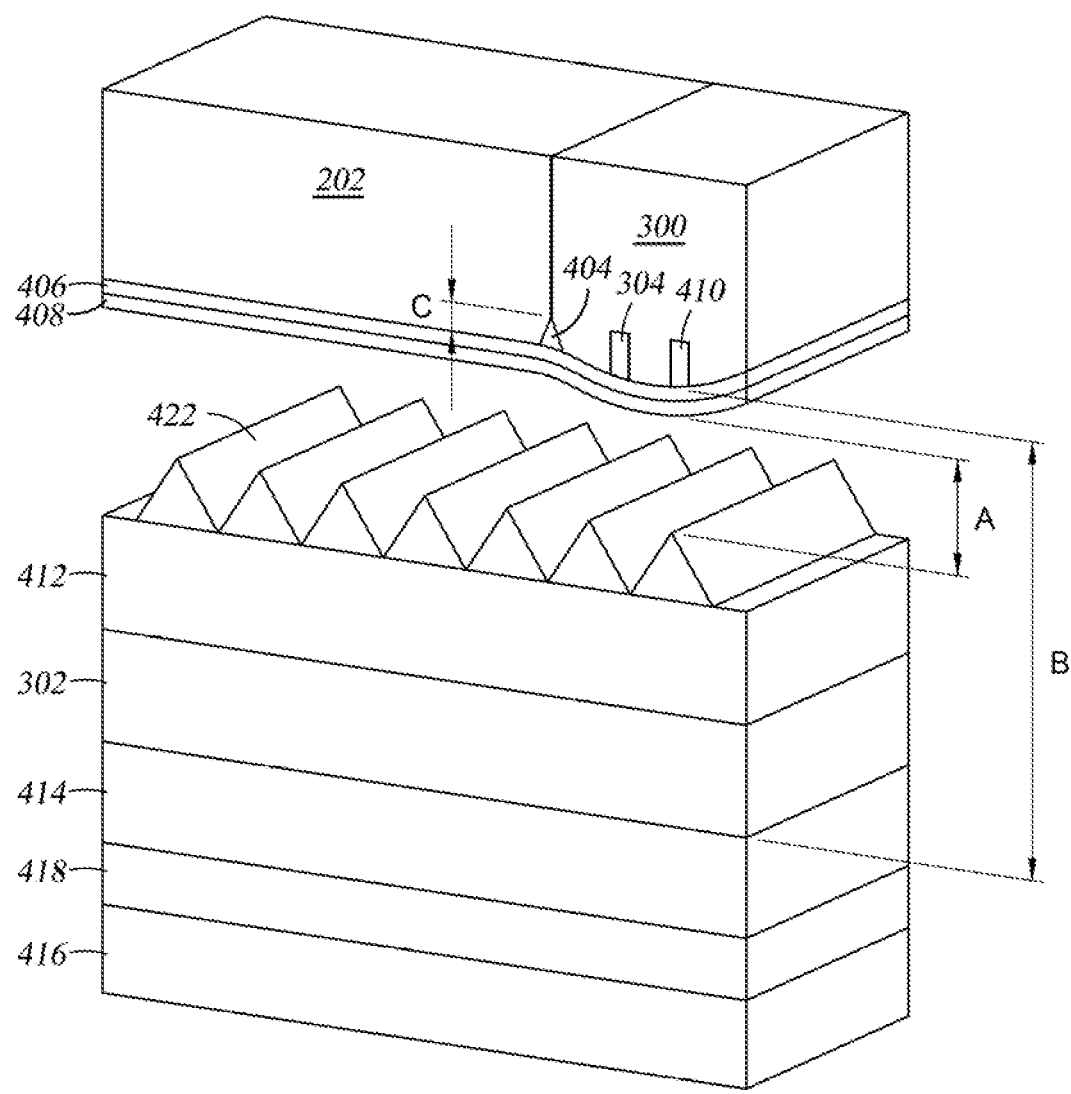
Figure 5:
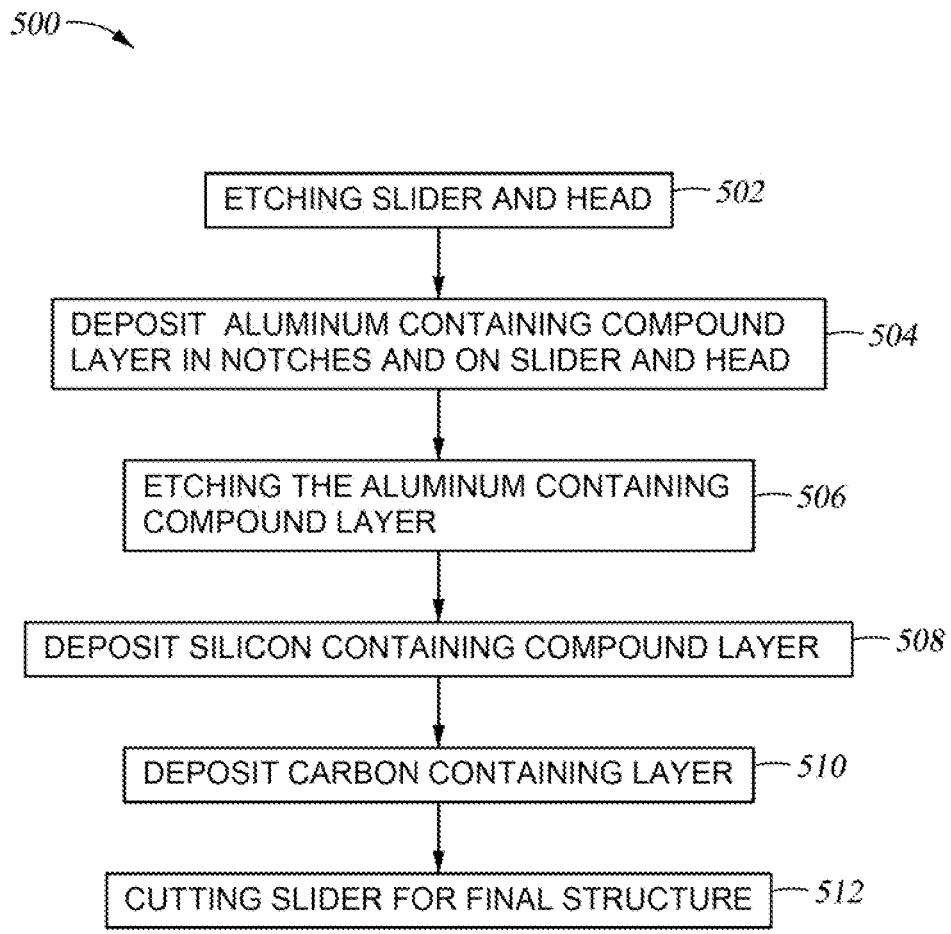
FIG. 5 is a flow chart illustrating a method of manufacturing a magnetic device according to one embodiment.

FIGS. 4A-4E are schematic illustrations of a magnetic device at various stages of fabrication according to one embodiment of the disclosure. FIG. 5 is a flow chart 500 illustrating a method of manufacturing a magnetic device according to one embodiment. As shown in FIG. 4A, the device includes a slider 202 having a read/write head 300 coupled thereto. The slider 202 and head 300 have been etched back as during an etching process (502). In one embodiment, the etching may comprise ion beam etching. During the etching, notches 402 are formed between the slider 202 and the head 300. Additionally and/or alternatively, notches 402 may already be present prior to etching. The notches 402 may be formed prior to the ABSOC process. The notches are then filled by depositing an aluminum containing compound layer 404 into the notches and across the surface 404 of the slider 202 and head 300 (504). The aluminum containing compound layer 404 may comprise aluminum oxide, aluminum nitride, or combinations thereof. The aluminum containing compound layer 404 may be deposited to a thickness of more than 20 Angstroms to ensure the notches 402 are filled. Thereafter, the aluminum is etched back such that the aluminum present is between about 1.0 Angstroms and about 4.0 Angstrom, such as about 2.5 Angstroms and about 3.5 Angstroms, and is present in the notches 402. The aluminum containing compound layer 404 may be deposited by deposition methods such as physical vapor deposition (PVD), chemical vapor deposition (CVD), plasma enhanced CVD (PECVD), atomic layer deposition (ALD) and other suitable deposition methods. In one embodiment, the aluminum containing compound layer 404 may be deposited by RF magnetron sputtering. In another embodiment, the aluminum containing compound layer 404 may be deposited by DC magnetron sputtering.

Once deposited, the aluminum containing compound layer 404 is then etched back such that the aluminum containing compound layer 404 is removed from the slider 202 and head 300, but remains in the notches 402 (506). In one embodiment, the aluminum containing compound layer 404 is etched by ion beam etching. Thereafter, a silicon containing compound layer 406 is deposited over the slider 202, head 300 and aluminum containing compound layer 404 remaining in the notches 402 (508). The silicon containing compound layer 406 is deposited to a thickness of between about 1.0 Angstroms and about 6.0 Angstroms, such as about 4.1 Angstroms and about 5.1 Angstroms. The silicon containing compound layer 406 may be deposited by suitable deposition methods discussed above with regards to the aluminum containing compound layer 404. In one embodiment, the silicon containing compound layer 406 may be deposited by DC magnetron sputtering.

After the silicon containing compound layer 406 is deposited, a carbon containing layer 408 is deposited on the silicon containing compound layer 406 (510). The carbon containing layer 408 may be deposited by suitable deposition methods such as mentioned above with regards to the aluminum containing compound layer 404. The carbon containing layer 408 may have a thickness of between 8 Angstroms and 18 Angstroms, such as between about 12 Angstroms and about 18 Angstroms. In one embodiment, the carbon containing layer 408 is deposited by a pulsed filtered cathodic arc process. The slider 202 is then cut for form the final structure (510).

The resulting device includes the write element 410 and read sensor 304 in the head 300 that are spaced from the magnetic disk 302. Shown in FIG. 3, the magnetic disk 302 includes a lubrication layer 412, a recording layer 414, a soft underlayer 416, an exchange break layer 418 disposed between the recording layer 414 and the soft underlayer 416, and a carbon overcoat layer 420 disposed between the recording layer 414 and the lubrication layer 412. The recording surface 422 may have peaks and valleys due to grooves formed in the recording surface 422. The head 300 may expand towards the recording surface 422 during operation as desired. The mechanical clearance between the carbon containing layer 408 of the magnetic device and the recording surface 422 is shown by arrow "A" and may be up to about 10 μm. The read sensor 302 and the write element 410 are spaced from the recording layer by a distance referred to as the magnetic spacing (represented by arrow "B") and may be up to about 10 μm. The notch 402 may have a depth of less than about 2 nm as shown by arrow "C".

The aluminum containing compound layer 404 is beneficial to reduce noise in the head 300 during operations. The aluminum containing compound layer 404 reduces the thickness needed for the silicon containing compound layer 406. The silicon containing compound layer 406, if used without the aluminum containing compound layer 404, would have a variation of about 1.5 Angstroms while the variation is only about 0.9 Angstroms when using the aluminum containing compound layer 404. Thus, the aluminum containing compound layer 404 permits the head 300 to be protected as the ABSOC, but also reduces the noise during read/write operations and has more accuracy in total thickness of the ABSOC.

While the foregoing is directed to exemplary embodiments, other and further embodiments of the disclosure may be devised without departing from the basic scope thereof, and the scope thereof is determined by the claims that follow.

What is claimed is:

1. A magnetic device, comprising:
a slider having a surface for facing a magnetic disk;
a magnetic head coupled to the slider, wherein the magnetic head has an air bearing surface for facing the magnetic disk, wherein a notch is formed between the slider and the magnetic head, and wherein the notch is filled with an aluminum containing compound layer;
a read sensor disposed in the magnetic head;
a write element disposed in the magnetic head; and
an air bearing surface overcoat structure disposed on the air bearing surface, wherein the air bearing surface overcoat structure comprises the aluminum containing compound layer and a silicon containing compound layer, wherein the silicon containing compound layer is in physical contact with the read sensor and the write element.

2. The magnetic device of claim 1, wherein the aluminum containing compound layer comprises aluminum nitride.

3. The magnetic device of claim 1, wherein the aluminum containing compound layer comprises aluminum oxide.

4. The magnetic device of claim 1, wherein the air bearing surface overcoat structure further comprises a layer comprising carbon disposed on the silicon containing compound layer.

5. The magnetic device of claim 4, wherein the silicon containing compound layer comprises silicon nitride.

6. The magnetic device of claim 4, wherein the aluminum containing compound layer has a thickness of less than about 2 nm.

7. The magnetic device of claim 4, wherein the silicon containing compound layer has a thickness of between 1.0 Angstroms and 6.0 Angstroms.

8. The magnetic device of claim 4, wherein the layer comprising carbon has a thickness of between 8 Angstroms and 18 Angstroms.

\* \* \* \* \*